(No Model.)
J. P. SHERWOOD.
Earthenware Vessel.
No. 238,722.                    Patented March 8, 1881.
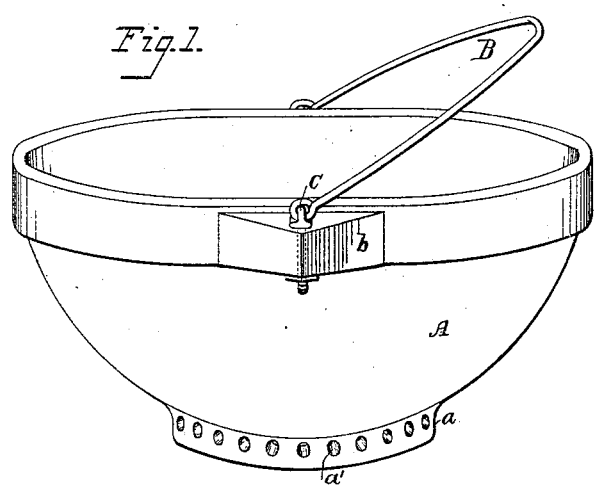
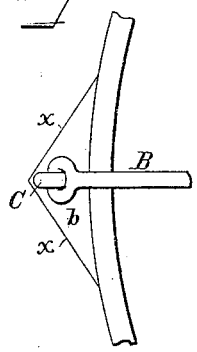
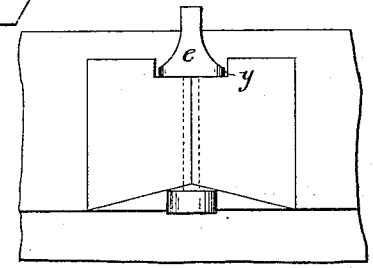
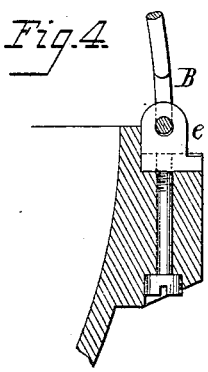
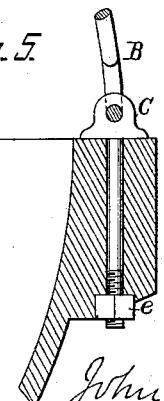
Attest:
Courtney A. Cooper
William Paxton
John P. Sherwood
By his attorney
Charles E. Foster

UNITED STATES PATENT OFFICE.

JOHN P. SHERWOOD, OF NEW BRIGHTON, PENNSYLVANIA, ASSIGNOR TO ELVERSON, SHERWOOD & CO., OF SAME PLACE.

EARTHENWARE VESSEL.

SPECIFICATION forming part of Letters Patent No. 238,722, dated March 8, 1881.

Application filed October 1, 1880. (No model.)

*To all whom it may concern:*

Be it known that I, JOHN P. SHERWOOD, of New Brighton, Beaver county, Pennsylvania, have invented certain Improvements in Earthenware Vessels, of which the following is the specification.

My improvement relates to that class of cooking-vessels made of earthenware to which handles or bails are flexibly attached, the object of my invention being to securely connect the bail, facilitate the attachment, and impart increased durability.

In the drawings, Figure 1 is a perspective view of a bowl with bail attached, illustrating my improvements. Fig. 2 is a plan view of part of the bowl. Fig. 3 is a side view of Fig. 2; Fig. 4, a section illustrating a modification; Fig. 5, a section showing another modification.

The body A of the bowl may be of any suitable form, and, where it is intended to be used for cooking, is preferably provided with a bottom rim, $a$, which maintains the bottom of the bowl free from contact with the heated plates of the stove, while openings $a'$ in the rim permit air to circulate, reducing liability of breakage from too sudden an increase of temperature.

The bail B is flexibly connected to eyebolts C, attached to ears $b$, projecting from opposite sides of the bowl.

Heretofore in vessels of this class the ears $b$ have had sides at right angles, or thereabout, to the face of the bowl, thereby presenting abrupt shoulders, which, when struck by any object, would result in breaking the ears from the body of the bowl.

I secure increased durability by forming the ears with bevel sides $x$, Fig. 2, which do not afford any hold or bearing, but rather deflect any object striking the same, thus warding off and decreasing the force of the blow.

The eyebolt C is secured by a nut, $e$, which may be at the lower threaded end of the bolt, the eye being at the upper end, as in Figs. 1 and 5. The nut $e$ may be formed into an eye to receive the loop of the bail, the bolt being passed upward through the ears $b$, as shown in Figs. 3 and 4.

A recess or socket, $y$, formed at the upper side of the ear, is adapted to the nut, and prevents the latter from turning so as to loosen the bolt; or the recess may be formed in the lower side, as shown in Fig. 5, in which case, after the bolt and its nut have once been adjusted to the position shown, and the bail has been connected, it will be impossible for the bolt to become loosened until the bail is removed.

The firm connection of the bolt or other metallic attachment to the ear is of much importance, as, if there is any play, it is liable to result in the fracture of the ear and destruction of the vessel. The attachment cannot be embedded and formed into the ear, and it is therefore necessary to adopt some other means whereby it may be secured fixedly in its position. I have shown such means in the drawings.

I do not here claim, broadly, the combination, with the ears of an earthen vessel, of metallic fastening devices for the bail; nor do I claim the combination, with a perforated bail-ear, of a bolt or wire loosely secured therein, as these may form the subject of a separate application for Letters Patent.

I claim—

1. The combination of a bail and metallic attachments with an earthen bowl provided with side ears connected to said attachments, and each having two side faces beveled from the front to the sides of the bowl, as set forth.

2. The combination, with an earthen bowl having side ears and a swinging bail, of metal attachments connected to said bail, and with heads or nuts fitting recesses in said ears, whereby the loosening of said attachments is prevented, substantially as described.

In testimony whereof I have signed my name to this specification in the presence of two subscribing witnesses.

JOHN P. SHERWOOD.

Witnesses:
JOHN JAGGER,
WM. F. LLOYD.